Figure 1:
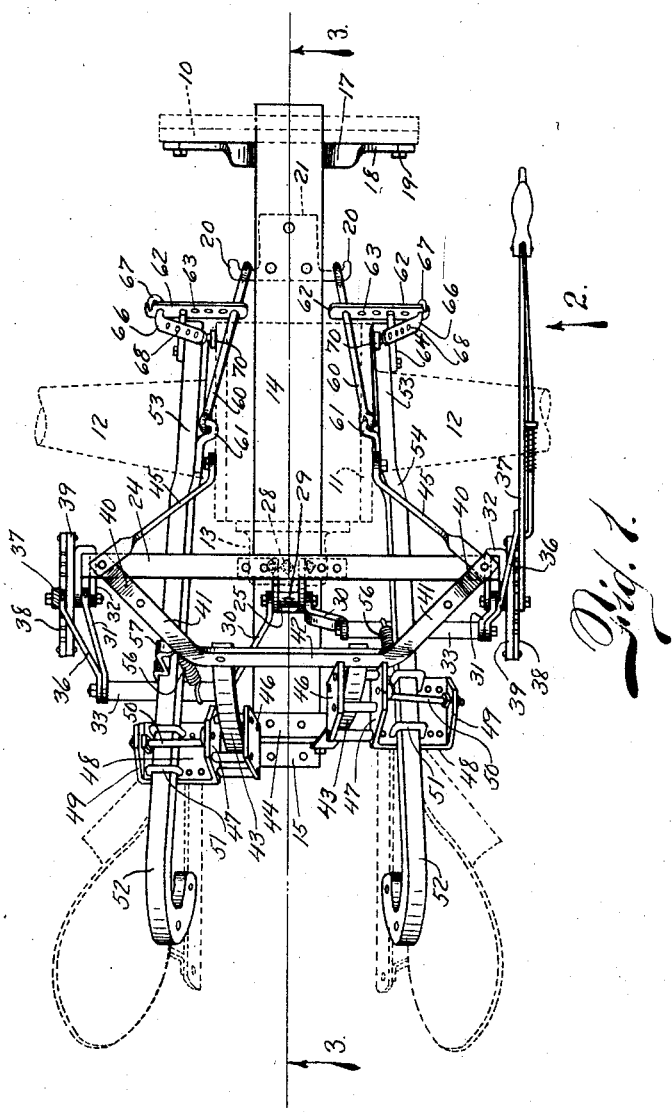

May 15, 1928.  1,670,270
M. B. MONSON
TRACTOR SUPPORTED PLOWING ATTACHMENT
Filed Feb. 18, 1926  3 Sheets-Sheet 1

Witness
John B. Wade

Inventor
Martin B. Monson
by Wilkinson & Giusta
his Attorneys

May 15, 1928.

M. B. MONSON 1,670,270

TRACTOR SUPPORTED PLOWING ATTACHMENT

Filed Feb. 18, 1926     3 Sheets—Sheet 2

Witness
John B. Dade

Inventor
Martin B. Monson.
by Dickinson & Ginsta
his Attorneys

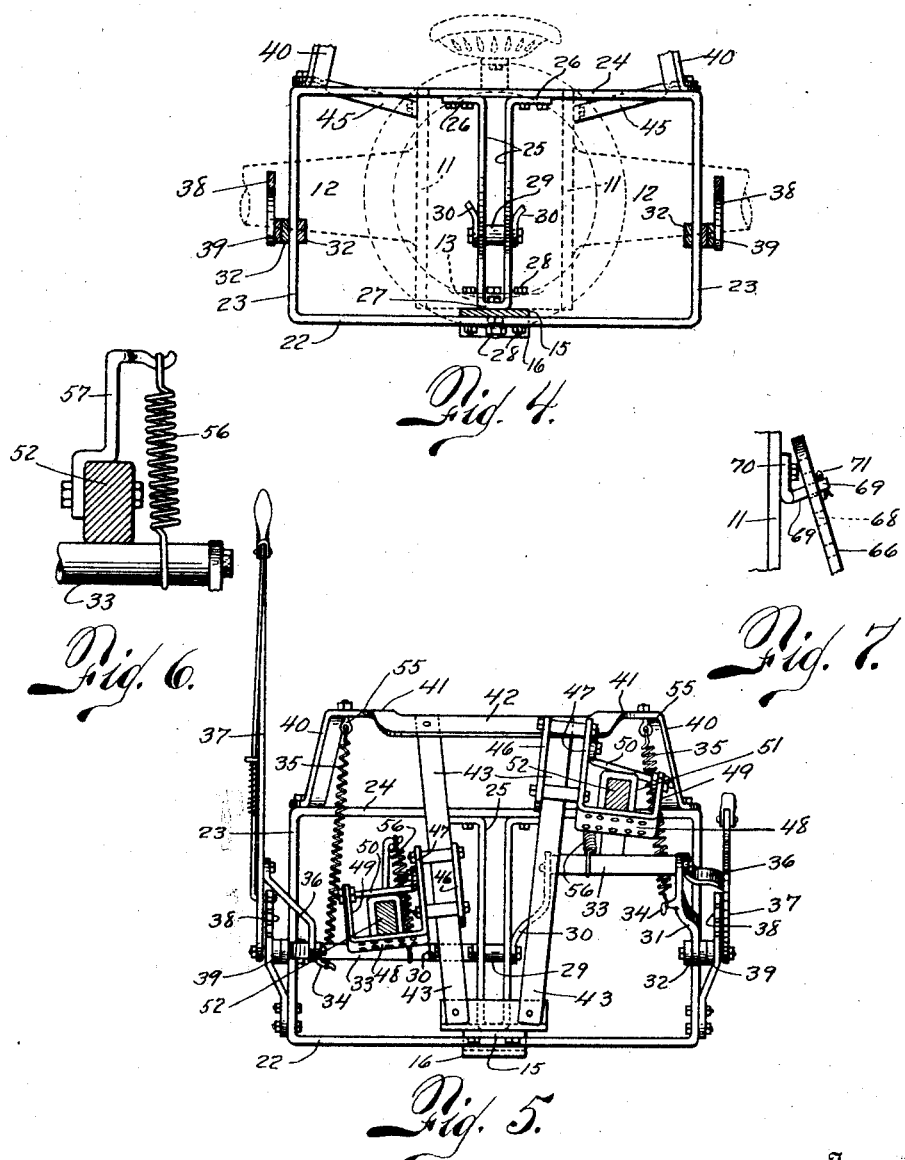

Patented May 15, 1928.

1,670,270

UNITED STATES PATENT OFFICE.

MARTIN B. MONSON, OF JEFFERSON COUNTY, COLORADO, ASSIGNOR, BY DIRECT AND MESNE ASSIGNMENTS, TO THE MORO PLOW & MANUFACTURING COMPANY, OF DENVER, COLORADO, A CORPORATION OF COLORADO.

TRACTOR-SUPPORTED PLOWING ATTACHMENT.

Application filed February 18, 1926. Serial No. 89,107.

This invention relates to tractor-supported plowing attachments and more particularly to the means for mounting and adjustably controlling the plowing means thereof.

The improvements have been more especially devised with reference to that type of tractor plows with which each of a balanced pair of laterally spaced plows, alternatively operative for two-way plowing, has its plow beam dually mounted by means of substantially spaced forwardly and rearwardly disposed supporting elements in directly suspended association with the tractor, the forward support providing for pivotal connection, between the plow beam and a main body part of the tractor, while the rearward element functions as a movable support for controlling the raising and lowering of the plow beam with its attached plow body or bottom, and the advantages of which are well understood.

However, while I have illustrated and shall describe my improvements with more particular reference to two-way plowing apparatus, it is nevertheless emphasized at the outset that I do not wish to unnecessarily limit myself to this particular use, in all instances, excepting where especially claimed, because from another aspect the invention actually comprehends the broader embodiment of the novel combination of elements relatively to a single plow beam and its attached bottom.

Primary objects of the invention have been to simplify, strengthen and generally perfect plow beam mountings of the aforesaid analogous type, not only for more facile operation, increased efficiency and durability in use, but also from the viewpoints of economy in manufacture and the material saving of time, trouble and expense in installation and demounting operations, in which latter connection a further primary object has been to so devise and combine the elements of the improvements that, if desired, they may be installed, in directly suspended association with the tractor, and detached therefrom, as a fully assembled unit, and especially with reference to a certain type of relatively low cost and compactly built tractor which has its main body extending down well below the axis of its driven traction wheels.

The foregoing and other objects and advantageous features, however, will be so clearly apparent it is believed as incidental to the following disclosure that it would serve no particularly useful purpose to further enlarge upon the same initially, and with these general outlining remarks, therefore, reference will now be immediately had to the accompanying drawings, illustrating a practical embodiment of the improvements, in which drawings—

Figure 2:
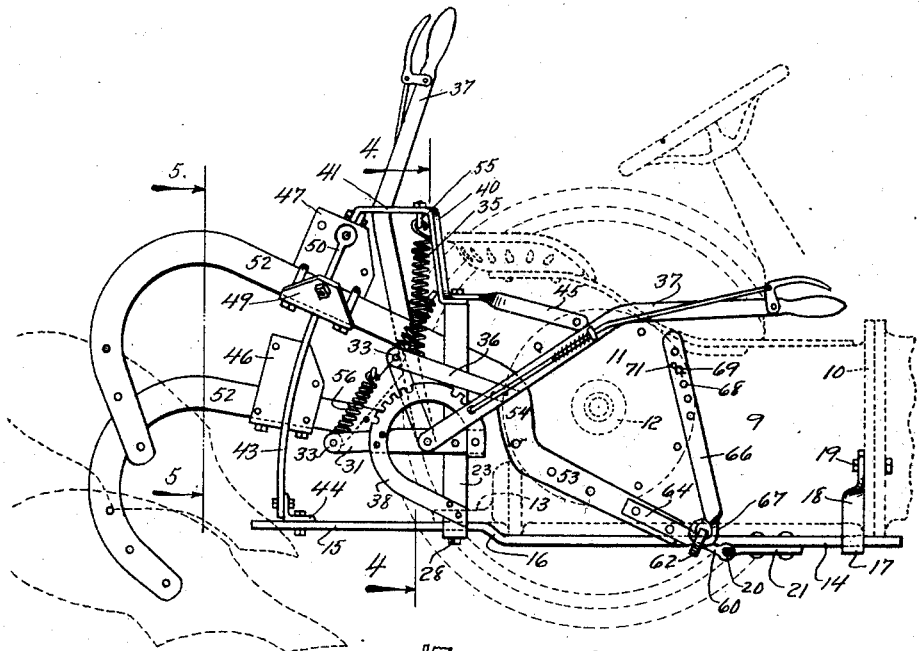
Figure 3:
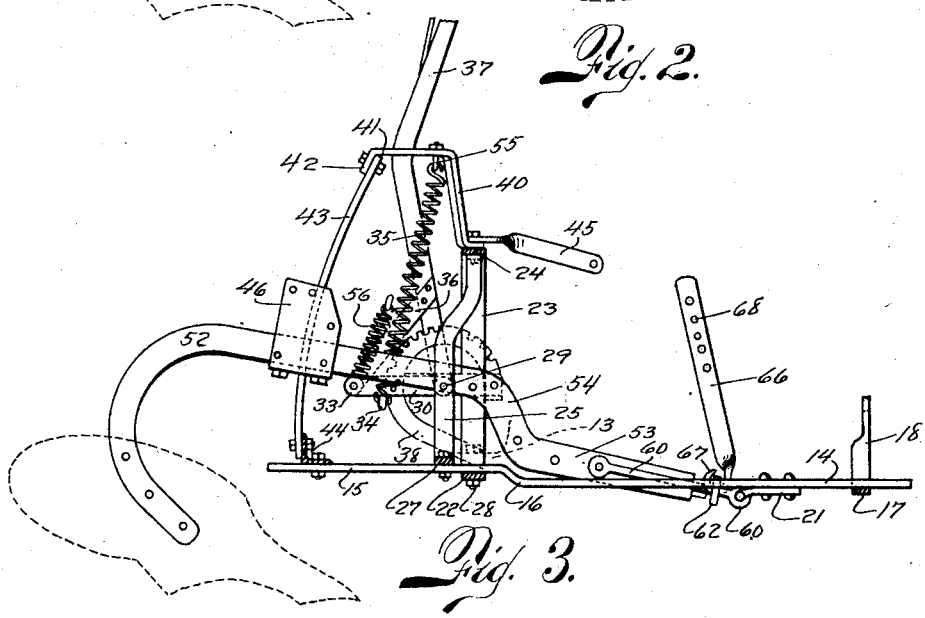

Figure 1 is a top plan view of the improvements, shown in applied relation relatively to a tractor, with the left side plow beam fully elevated, out of plowing relation, and with the right side plow beam lowered into plowing position, the plow bottoms and parts only of the tractor being shown in dotted outline; Figure 2 is a right side elevational view thereof; Figure 3 is a central longitudinal sectional view of the improvements, taken substantially along the line 3—3 of Figure 1; Figure 4 is a detail cross-sectional view, taken substantially along the line 4—4 of Figure 2; Figure 5 is substantially a rear elevational view of the improvements, being a cross-section taken substantially along the line 5—5 of Figure 2; Figure 6 is a local detail view showing a spring interposed between a plow beam and its rear supporting element; and Figure 7 is a local detail view of the upper portion of a connection between the forward end of a plow beam and the transmission housing of the tractor.

Briefly referring to certain parts of a tractor adapted for the attachment of my improvements, the numeral 9 indicates the transmission housing which may have a forward annular coupling flange 10 and the worm drive casing's head plates 11 carrying conical axle casings 12, the rear central end of the tractor being provided with a tail lug or drawbar cap 13.

The numerals 14 and 15 respectively designate forward and rear arm portions of an elongated base bar support, the forward arm 14 of which is adapted to extend longitudinally, from immediately below the drawbar cap 13, underneath the central bottom of the housing 9, and with its rear arm 15 projected substantially beyond said drawbar cap. The forward arm 14 may be disposed in slightly spaced relation to the bottom of the housing 9, by reason of the offsetting bend 16, and its forward end is adapted to be freely supported by the transverse base web 17 of a metal hanger strap that has its angular hanger members 18 securely suspended from the transmission housing in any suitable way, preferably being bolted as at 19 or otherwise anchored to the coupling flange element 10.

Towards the forward end of said base bar the same is provided with a pair of oppositely projected lateral lugs 20, which have curved ends and are shown as an integral part of an affixing plate 21 securely bolted to the underneath face of the arm 14.

The base sill 22 of an upstanding rectangular frame support, embodying vertical side legs 23 and top bar 24, extends transversely underneath the rear arm 15 of the aforesaid base bar support, immediately behind the offsetting bend 16 thereof, and while this base sill 22 is adapted to be conjointly bolted to the arm 15 and the drawbar cap 13, still the rectangular frame is further supported and braced by a central post extending between and secured to the said top bar 24 and said base bar arm 5. This central vertical post may be a solid casting but is illustrated as being of U-shape, embodying the spaced upstanding side bars 25 having their upper portions forwardly offset from their lower portions and being laterally bent at their upper ends to form flanges 26, for bolting to the underneath face of the top bar 24, the bottom web 27 thereof being bolted to the top face of the arm 15, rearwardly of the rectangular frame or at a position slightly distant from where a plurality of bolts 28 are adapted to conjointly fasten together the base sill 22, the rear arm 15 and the drawbar cap 13, so that this central post provides for a very substantial rear brace or strut bar for the rectangular frame structure. However, this central post need not necessarily have its upper and lower portions relatively offset, but could be contained wholly within the rectangular frame, in which event the base web 27, or its equivalent, may be conjointly secured to the other parts by the central one of the bolts 28.

This central post supports an axis pin element, more clearly represented by the spacing member 29 having nut receiving pintles to pivotally mount the lower ends of the inside swinging arms 30 of a pair of independently actuated cranks, the outer arms 31 thereof being pivotally connected to supports 32 rearwardly projected from the side legs 23 of the rectangular frame, and the outer ends of each of the paired swinging arms carrying a transverse crank arm 33, which may be a roller if desired, that is adapted to ride in engagement with the underneath face of the rear section of a plow beam, as hereinafter referred to.

Intermediate of their ends, each of the outside crank arms 31 is provided with a lug 34 for the attachment of the lower end of a cylindrical spring 35, hereinafter more particularly referred to, and the outer end of each of the crank arms 31 is connected, by means of a pivoting link 36, to a complementary operating lever 37 that may be pivoted on the axis pin mounting the lower end of a crank arm 31. Each of the operating levers 37 has a manually actuated pawl associated with a curved rack bar 38 having forwardly and rearwardly located pawl receiving notches along its upper face, the element 39 simply being a brace strap that subtends the curved rack bar from a position either on the inside or outside thereof. The use of the connecting link 36 is preferred, as it doubtless provides for more effective leverage, but it could possibly be dispensed with, in which latter event the lower ends of the crank arms 31 and the levers 37 would be fixedly attached to their complementary axis pin, to conjointly turn therewith instead of pivoting thereon.

The aforesaid rectangular frame is provided with a surmounting frame support embodying the upstanding legs 40, securely attached at their lower ends to the top bar 24, the rearwardly convergent top side arms 41, and the rear cross-bar 42.

A pair of rearwardly curving or arcuate guide bars 43, preferably converging downwardly, extend between and are rigidly secured at their respective ends to said rear cross-bar 42 and the outer end of the rearwardly projecting portion 15 of the main base bar support for the attachments as a whole, the lower securing means being shown as a bolted flange element 44.

The arcuate bars 43, while primarily functioning as guide bars, also serve as rear braces or strut bars, and in conjunction with the surmounting frame support and the central post element 25 provide very substantial bracing means for the rectangular frame support, the arrangement as a whole being rigidly self-trussed as it were, which is very essential in view of the heavy strains and stresses imposed upon this supporting structure as a whole. The said bracing is further augmented, when the attachments are actually applied to the tractor, by virtue of forwardly projected angularly disposed attaching bars 45 connecting the top bar 24 of the rectangular frame with the head plates 11 of the tractor's worm drive gear housing.

To prevent undue lateral displacement of the rear end portion of the plow beam, and hence the plow bottoms indicated in dotted outline, while at the same time providing for a limited lateral adjustment of the same, as desired, I provide guide boxes associated with said guide bars 43, and having outwardly disposed base extensions for supporting the plow beams. Each of these devices embody an inner side plate 46 and an outer side plate 47, bolted together in vertically spaced relation to straddle their complementary guide bar 43 as shown. Each of the outer side plates 47 is formed with a base extension 48 terminating in an upturned lip 49 that is connected with its side plate 47 by an adjusting tie-rod 50, and the base extension 48 being provided with a double series of equidistantly spaced apertures for receiving the ends of U-bolts 51 that fasten the rear end section 52 of a plow beam to said base extension, but in laterally adjustable relation, the forward section 53 of the plow beam being downwardly offset from the rear section by virtue of the bend 54.

It will be noted that the crank arms 33, for controlling the elevation and lowering of the rear plow beam sections, travel in arcuate paths, forwardly of said guiding boxes, and in engagement with the underneath face of the rear section 52 of their complementary plow beam.

In order to assist in the raising of the plow beams, for elevating the plow bottoms relatively to the soil being worked, as desired, I employ the elongated cylindrical coil springs 35, one of which is attached at its lower end to its complementary lug 34 of the crank arm 31, as has before been described, and the upper ends of which springs are suitably connected to their respective side arm 41, of the surmounting frame support, as by means of eye-bolts 55. These springs accordingly exert an upward pull on the cranks in substantially a direct vertical line.

Also, in order to hold the plow beams firmly down upon their crank arms 33, for the purpose of positively holding the plow shares down to their work but with some resilient compensation in the event that too hard a substance is encountered, I additionally provide the auxiliary short and stiff coil springs 56, the lower ends of which are connected to their respective crank arm 33, and the upper ends of which are connected to a complementary upstanding bracket arm 57 securely attached to its plow beam, as seen more clearly at Figures 1 and 6.

The forward section 53 of each of the plow beams is provided with a draft rod 60 that is pivotally connected at its inner end, as at 61, to the inner face of the plow beam at a position fairly distant from the end of the beam, and at its outer end the draft rod is formed with an eye that detachably encompasses one of the lugs 20, laterally projected from the base bar end portion 14, in pivotal association therewith. This draft rod 60 extends freely through the inner end of a laterally disposed shackle bar 62 that is formed with a series of apertures 63 to provide for a limited lateral adjustment of the forward end of the plow beam, this end of the plow beam mounting a short bar member 64, preferably secured to the outer face thereof, which member terminates in a forwardly disposed lug or stud pin adapted to project through a predetermined one of the apertures 63, and the complementary shackle bar 62 being retained, as so adjustably positioned, by means such as a cotter pin passed through the end of the lug forwardly of the shackle bar, which will be obvious although not actually shown in this particular connection.

The forward end of each of the plow beams is vertically supported by means of a suspension bar 66 that has a hook 67 at its lower end, which hook is adapted to be projected through an outer aperture 63 of its complementary shackle bar 62, the upper end of the suspension bar being suitably connected with a part of the tractor body. In order to provide for a limited vertical adjustment of the forward end of the plow beam, however, in addition to its limited lateral adjustment as before described, the upper portion of the suspension bar 66 is formed with a series of apertures 68, a selected one of which is adapted to encompass a lug or stud pin 69 carried by an attaching member 70, securely affixed to the upper portion of the tractor body, preferably to a head plate 11 of the worm drive gear casing, see Figure 7, the suspension bar 66 being retained, as so adjustably positioned, by a cotter pin 71 passed through the end of the lug 69.

From the foregoing complete description, it is believed that the operations will be fairly apparent, it being obvious that upon actuating one of the levers 37 forwardly, say the right side lever as more clearly seen from Figure 2, the cross-arm 33 of the crank element connected with that lever will be swung in an upwardly and forwardly arcuate path, and as this crank arm 33 rides in engagement with the underneath face of the rear portion 52 of the plow beam, it follows that the latter will be tiltingly elevated, with the forward portion thereof trunnioning vertically by virtue of its pivotal connection at 20. During this tilting elevation of the plow beam with its attached plow body or bottom, the combined weight of which is substantially heavy, the spring 35 will materially assist the operation. It is to be particularly noted and emphasized, however, that this spring 35 is not actually connected to the plow beam, as has heretofore been proposed, but is directly attached at its lower end to a part of the elevating crank element, for a reason and novel functioning which will more clearly appear hereinafter in connection with the functioning of the auxiliary spring 56.

During the reverse movement, for the operative positioning of the plow as shown by the left side plow of Figure 2, the plow would normally be lowered of its own weight as the crank arm 33 tends to recede therefrom in its arcuate swing downwardly and rearwardly, but, after the plow bottom has reached the ground, in order to hold its share fully down to its work, with a certain amount of resilient give where stony soil is encountered, and therefore to hold its beam down upon said crank arm 33, I provide the auxiliary spring 56 interposed between the plow beam and a part of the crank element, for instance in the manner as illustrated and before described. This is the principal purpose of the auxiliary spring 56, but as a matter of fact it also augments the weight of the plow in the more positive action of lowering the plow, owing to the downward pull exerted by the spring 56 on the plow beam as the crank arm 33 tends to move downwardly away therefrom. As the crank element is held secured, in its various adjusted positions, by the pawl and rack arrangement associated with the operating lever, it follows that the main spring 35, being connected to the crank element and not to the plow beam, will have no counteracting effect upon the proper functioning of the auxiliary spring 56, and which it would have if the main spring 35 were attached to the plow beam.

The lateral adjustment of the rear plow beam portion, as by means of the U-bolts 51 and apertures in the extension base 48 of the guide boxes, is provided for to regulate the lateral bite of the plow share in the soil, hence the width of the cut, and to a certain extent this is also provided for by the lateral adjustment of the forward end of the plow beam, as by means of the apertures 63 of the shackle bar, although the main purpose of the forward lateral adjustment is to hold the plow beam in proper line relatively to its rear lateral adjustment. The lining up of the plow beam may also be further regulated to a nicety by means of the adjusting tie-bar 50, because obviously by tightening up on the nut thereof the upstanding lip 49 is drawn towards the side plate 47, which will cause the extension base 48 to be cramped or sprung upwardly in a slight degree, but sufficiently to straighten up the plow beam relatively to a vertical plane, and the reverse would be true when the nut was eased up. The limited vertical adjustment of the forward end of the plow beam, as by means of the apertures 68 of the hanger bars 66, is for the purpose of directing the plow point more or less downwardly or upwardly, as desired, to either cause a more positive biting down into the earth or to make more of a glancing cut upwardly. These adjustments may not appear to be very material, and in so far as my broader invention is concerned they may not be so essential, but they are nevertheless very desirable for practical tractor plowing, especially under various soil conditions. Furthermore, while I have shown and described simple means for making such adjustments, it is obvious that various means might be employed for accomplishing the same.

Finally, while I have referred to the elements 60 as draft rods, as a matter of fact the disposition of these rods could be reversed so as to function as push rods, and from a broader sense therefore the elements 60 might be more appropriately termed as coupling rods.

At all events, it will be seen that each plow beam is directly supported, in suspended relation from the tractor, at two positions, one position being a pivotal connection located forwardly of the axis of the traction wheels, and the other position being a vertically movable support located rearwardly of said axis, which vertically movable support is a crank arm engaging the underneath face of rear portion of the plow beam, with the driving power applied to the plow beam at a position well ahead of the rear end of the tractor and substantially towards its base, or below the zone of its body proper.

Although I have thus fully disclosed my improvements, it will be understood that I do not limit myself to the exact details, excepting as they may come within the terms of the claims, or equivalent elements and combinations thereof, or as fairly interpreted in the light of the specification if necessary.

What I do claim, as new and patentable, is:—

1. In tractor plowing attachments, the combination of a supporting structure, a crank-like element carried thereby and having its cross-arm movable in a vertical arcuate path, means for swinging and adjustably securing said crank-like element, a plow beam having its rear portion supported upon said cross-arm, resilient means so interposed between said plow beam and crank-like element as to force said plow beam towards said cross-arm, means for securing said supporting structure to the tractor, and coupling means for connecting the forward portion of said plow beam thereto.

2. In tractor plowing attachments, the combination of a supporting structure, a crank-like element carried thereby and having its cross-arm movable in a vertical arcuate path, means for swinging and adjustably securing said crank-like element, a plow beam having its rear portion supported upon said cross-arm, resilient means so interposed between said supporting structure and crank-like element as to exert an upward force upon the latter, means for securing said supporting structure to the tractor, and coupling means for connecting the forward portion of said plow beam thereto.

3. In tractor plowing attachments, the combination of a supporting structure, a crank-like element carried thereby and having its cross-arm movable in a vertical arcuate path, means for swinging and adjustably securing said crank-like element, a plow beam having its rear portion supported upon said cross-arm, resilient means so interposed between said supporting structure and crank-like element as to exert an upward force upon the latter, resilient means so interposed between said plow beam and crank-like element as to force said plow beam towards said cross-arm, means for securing said supporting structure to the tractor, and coupling means for connecting the forward portion of said plow beam thereto.

4. In tractor plowing attachments, the combination of a supporting structure embodying a vertically arcuate guide bar, a guide element associated with said guide bar and having a lateral extension, a plow beam having its rear portion adjustably connected to said lateral extension for the lateral adjustment of said rear portion, means for controlling the elevation and lowering of the rear portion of said plow beam, means for securing said supporting structure to the tractor, and coupling means for connecting the forward portion of said plow beam thereto.

5. In tractor plowing attachments, the combination of a supporting structure embodying a vertically arcuate guide bar, a traveling guide element associated with said guide bar, a plow beam having its rear portion adjustably connected to said guide element for the lateral adjustment of said rear portion, means carried by said supporting structure for supporting the rear portion of said plow beam and controlling the elevation and lowering thereof, means for securing said supporting structure to the tractor, coupling means for connecting the forward portion of said plow beam thereto with a normal limited lateral and vertical play, means for laterally adjusting the forward end of said plow beam, and means for vertically adjusting said forward end.

6. In tractor plowing attachments, the combination of an elongated base bar support, an upstanding supporting structure carried by the rear portion thereof, a plow beam, means carried by said upstanding structure for supporting the rear portion of said plow beam and controlling the elevation and lowering thereof, a coupling rod pivotally connected at its opposite ends respectively to said base bar and the forward portion of said plow beam, a shackle bar connecting the forward portion of said plow beam to said coupling rod in laterally adjustable relation, and a hanger bar for suspending the forward portion of said plow beam from the tractor in vertically adjustable relation.

7. In tractor two-way plowing attachments, the combination of an elongated base bar, adapted to be so rigidly supported by the tractor, in detachable relation therewith as to extend forwardly underneath the body of the same from the drawbar cap thereof, a pair of crank-like elements carried by the rear portion of said base bar in opposite substantially spaced lateral relation thereto, the cross-arm of each crank-like element being movable in a vertical arcuate path, means carried by said base bar for independently swinging and adjustably securing said crank-like elements, a pair of plow beams each having its rear end portion supported upon the cross-arm of its respective crank-like element, and coupling means connecting the forward portion of each of said plow beams to said base bar.

8. In tractor two-way plowing attachments, the combination of an elongated base bar, adapted to be so directly supported by the tractor as to extend forwardly and rearwardly from underneath the drawbar cap thereof, an upstanding frame carried by the inner rear portion of said base bar, a central upstanding post associated therewith, a pair of crank-like elements mounted by said post and the respective sides of said frame, means for independently swinging and adjustably securing said crank-like elements, a pair of plow beams each having its rear portion supported upon the cross-arm of its respective crank-like element, and coupling means connecting the forward portion of each of said plow beams to said base bar.

9. In tractor two-way plowing attachments, the combination of an elongated base bar, an upstanding supporting structure carried by the inner rear portion of said base bar and embodying a transverse base sill with vertical side bars, a central upstanding post associated therewith, a pair of crank-like elements mounted by said post and the respective side bars aforesaid, means for independently swinging and adjustably securing said crank-like elements, a pair of plow beams each having its rear portion supported upon the cross arm of its respective crank-like element, a coil spring so interposed between each of said plow beams and crank-like elements as to resiliently force its respective plow beam towards its supporting cross-arm, and coupling means connecting the forward portion of each of said plow beams to said base bar.

10. In tractor two-way plowing attachments, the combination of an elongated base bar, adapted to be so directly supported by the tractor as to extend forwardly and rearwardly from underneath the drawbar cap thereof, an upstanding supporting structure carried by the inner rear portion of said base bar and including a transverse base sill, with upstanding side bars, and a central upstanding post, a pair of crank-like elements mounted by said post and respective side bars, means for independently swinging and adjustably securing said crank-like elements, a pair of laterally spaced vertically arcuate guide bars extending as bracing means between said upstanding supporting structure and the outer rear portion of said base bar, a traveling guide associated with each of said guide bars, a pair of plow beams each having its rear portion supported upon the cross-arm of its respective crank-like element and being connected with a complementary one of said traveling guides, and coupling means connecting the forward portion of each of said plow beams to said base bar.

11. In tractor two-way plowing attachments, the combination of an elongated base bar, adapted to be so directly supported by the tractor as to extend forwardly and rearwardly from underneath the drawbar cap thereof, an upstanding frame carried by the inner rear portion of said base bar, a central post extending as a brace between said base bar and the top bar of said frame, a pair of crank-like elements mounted by said post and the respective side bars of said frame, means for independently swinging and adjustably securing said crank-like elements, a surmounting frame securely supported by said upstanding frame, a pair of laterally spaced vertically arcuate guide bars extending as bracing means between said surmounting frame and the outer rear portion of said base bar, a traveling guide associated with each of said guide bars, a pair of plow beams each having its rear portion supported upon the cross-arm of its respective crank-like element and being connected for lateral adjustment with its complementary traveling guide, a coil spring extending between each crank-like element and said surmounting frame, a coil spring so interposed between each of said plow beams and crank-like elements as to resiliently force the plow beam towards its supporting cross-arm, and coupling means connecting the forward portion of each of said plow beams to said base bar.

12. Detachable tractor-supported attachments, for mounting a pair of plow beams thereby in two-way plowing association, comprising an elongated base bar adapted to extend both forwardly and rearwardly underneath the rear wheel's axle of the tractor, means carried by the rear portion of said base bar, in assembled relation therewith, embodying a laterally spaced pair of vertically movable supports with means for actuating and adjustably securing the same, each of which movable supports is adapted to mount the rear portion of a respective plow beam to control the raising and lowering thereof at a position rearwardly of said axle, coupling means for respectively connecting the forward plow beam portions to said base bar substantially in advance of said axle, and means for detachably connecting said base bar to the tractor, with the said base bar functioning as a support for the attachments as an assembled unit.

In testimony whereof, I affix my signature.

MARTIN B. MONSON.